(12) United States Patent
Beck et al.

(10) Patent No.: US 7,436,820 B2
(45) Date of Patent: Oct. 14, 2008

(54) METHOD AND APPARATUS FOR PROVIDING FAULT TOLERANCE TO INTELLIGENT VOICE-OVER-IP ENDPOINT TERMINALS

(75) Inventors: Andre Beck, Woodbridge, NJ (US); Volker Hilt, Middletown, NJ (US); Markus Andreas Hofmann, Fair Haven, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 707 days.

(21) Appl. No.: 10/954,005

(22) Filed: Sep. 29, 2004

(65) Prior Publication Data

US 2006/0067323 A1 Mar. 30, 2006

(51) Int. Cl.
*H04L 12/66* (2006.01)
(52) U.S. Cl. ..................... 370/352; 370/401

(58) Field of Classification Search .............. None
See application file for complete search history.

(56) References Cited

U.S. PATENT DOCUMENTS

| | | | | |
|---|---|---|---|---|
| 6,128,304 A | * | 10/2000 | Gardell et al. | 370/401 |
| 2003/0179743 A1 | * | 9/2003 | Bosik et al. | 370/352 |
| 2005/0018659 A1 | * | 1/2005 | Gallant et al. | 370/352 |

* cited by examiner

*Primary Examiner*—Chau Nguyen
*Assistant Examiner*—Kenneth R Hartmann, II

(57) ABSTRACT

When an intelligent VoIP endpoint terminal on a VoIP network becomes inoperative for any reason and can't respond to a service request that it had been programmed for, rather than leaving that service request unfulfilled, a VoIP network-hosted instance of that primarily endpoint terminal-provided service is invoked to handle that request and provide the service that would have otherwise been provided by the endpoint terminal. The network-hosted instance thus executes the requested service on behalf of the unavailable endpoint terminal.

19 Claims, 4 Drawing Sheets

METHOD AND APPARATUS FOR PROVIDING FAULT TOLERANCE TO INTELLIGENT VOICE-OVER-IP ENDPOINT TERMINALS

TECHNICAL FIELD

This invention relates to Voice-over-IP (VoIP) networks, and more particularly, to failure protection for services provided by intelligent VoIP endpoint terminal.

BACKGROUND OF THE INVENTION

Historically, telephony networks have been designed around "dumb" endpoints that require all services to be provided from inside the network. This assumption shaped the architectural design of today's telephone networks and the technology used therein. With the advent of packet-based telephony, however, the world is about to undergo a dramatic and disruptive change. This change is caused by the fact that VoIP protocols like the Session Initiation Protocol (SIP) adhere to the "end-to-end" principle, which suggests that the network should be kept as simple as possible and that all intelligence should reside in the end systems. When applied to telephony networks, this means that a VoIP-based telephone infrastructure will bring about a paradigm shift from a network-centric to an endpoint-centric design.

Endpoint vendors are taking advantage of this fact by deploying intelligent VoIP phones, which provide services that were formerly hosted inside the network. For example SIP phones are available that support features such as call forwarding, call transfer, three-way conferencing, and call logging. Other phones are available, which support a Java-based runtime environment, that can host even more services and applications. Even further, a full-featured SIP endpoint terminal can be integrated into the Windows operating system, turning every PC into a sophisticated, easily programmable phone.

Disadvantageously, these VoIP endpoint-provided services cannot be provided as reliably as comparable services can currently be provided from within a PSTN network. In PSTN networks, telecom services such as call forwarding, call logging, teleconferencing, and voice mail, are typically provided by entities located within the service provider's network, such as at application servers or Service Control Points (SCPs). Continuous availability of these network-hosted services is maintained through the use of highly reliable hardware and software. In the event of a server or software failure, a secondary server typically takes over so that service can continue uninterrupted. When the provision of such services is shifted to intelligent VoIP endpoint terminals, which have more processing power than typical PSTN telephone terminals, their increased complexity makes them much less reliable than typical PSTN telephones. For example VoIP endpoint terminals may be switched off, crash, loose power, or in the case or wireless endpoint terminals, be out of reach. Thus, the endpoint terminal-provided services that the end user would assume to always be available would not be available when the endpoint terminal itself is unavailable for any reason.

SUMMARY OF THE INVENTION

When an intelligent VoIP endpoint terminal becomes inoperative for any reason and can't respond to a service request that it had been programmed for, rather than leaving that service request unfulfilled, a VoIP network-hosted instance of that primarily endpoint terminal-provided service is invoked to handle that request and provide the service that would have otherwise been provided by the endpoint terminal. The network-hosted instance thus executes the requested service on behalf of the unavailable endpoint terminal.

In providing such a fault-tolerant service for intelligent VoIP endpoint terminals, a configuration server within the network stores configuration data relating to the smart VoIP endpoint terminals of subscribers to a fault tolerant service. When a proxy, such as a SIP proxy, in the network that would otherwise invoke the service on the intelligent VoIP endpoint terminal detects that the endpoint terminal is unavailable to provide that service, a service request to that endpoint terminal is automatically transferred by the proxy to a fallback application server in the network, which seamlessly takes over. In providing that requested service, the fallback application server queries the configuration server to access the configuration data for that VoIP endpoint terminal in order to provide the service in the same manner as the smart VoIP endpoint terminal would have if it had been operative. A synchronization mechanism is established between the configuration server and the one or more smart VoIP endpoint terminals associated with a particular service in order to ensure that the service provided by the fallback application server is the same service that would have been provided by the endpoint terminal had it been operative.

In an exemplary embodiment, call forwarding is primarily enabled on an intelligent VoIP endpoint terminal. During the call establishment signaling phase of a call to that endpoint terminal from a calling party's own endpoint terminal, the proxy sends a message to that destination endpoint terminal, which has stored thereon rules for invoking a call forwarding service. If the currently applicable rules indicate a different address to which an incoming call should then be directed, the proxy redirects the message to that indicated address and, after a negotiation between the endpoints, a packetized audio bearer stream between the calling endpoint terminal and the call-forwarded endpoint terminal is thereafter established over the IP network. If the proxy doesn't receive a response in its original attempt to send a message to the called intelligent VoIP endpoint terminal, or determines that the called VoIP endpoint terminal is unavailable for any reason, then the proxy instead contacts the fallback application server in the network, which in turn retrieves the call forwarding information stored on the configuration server that mirrors the information stored on the intelligent VoIP endpoint terminal. The proxy then routes the message according to that stored information. Advantageously, the proxy doesn't need to access the forwarding information for standard call processing when the called intelligent VoIP endpoint terminal is operative to provide the alternative call forwarding information.

In another embodiment in which the intelligent VoIP endpoint terminal has a built-in voicemail capability, the proxy forwards an incoming call to a network voicemail server, which is the fallback application server, if it detects the failure of the called endpoint terminal. Advantageously, voicemail is always available to the user of the intelligent VoIP endpoint terminal regardless of whether or not that endpoint terminal is or is not operative.

In another embodiment, a call log that is normally created in a smart VoIP endpoint terminal is created in the network when the proxy detects the failure of the endpoint terminal. In this embodiment, the fallback application server is incorporated with the proxy. Advantageously, the call log created and stored in the network is small and its access load is minimal. Such network created call log can be synchronized with the endpoint terminal's call log when the intelligent VoIP endpoint terminal again becomes operative or is turned on.

DETAILED DESCRIPTION

Figure 1:
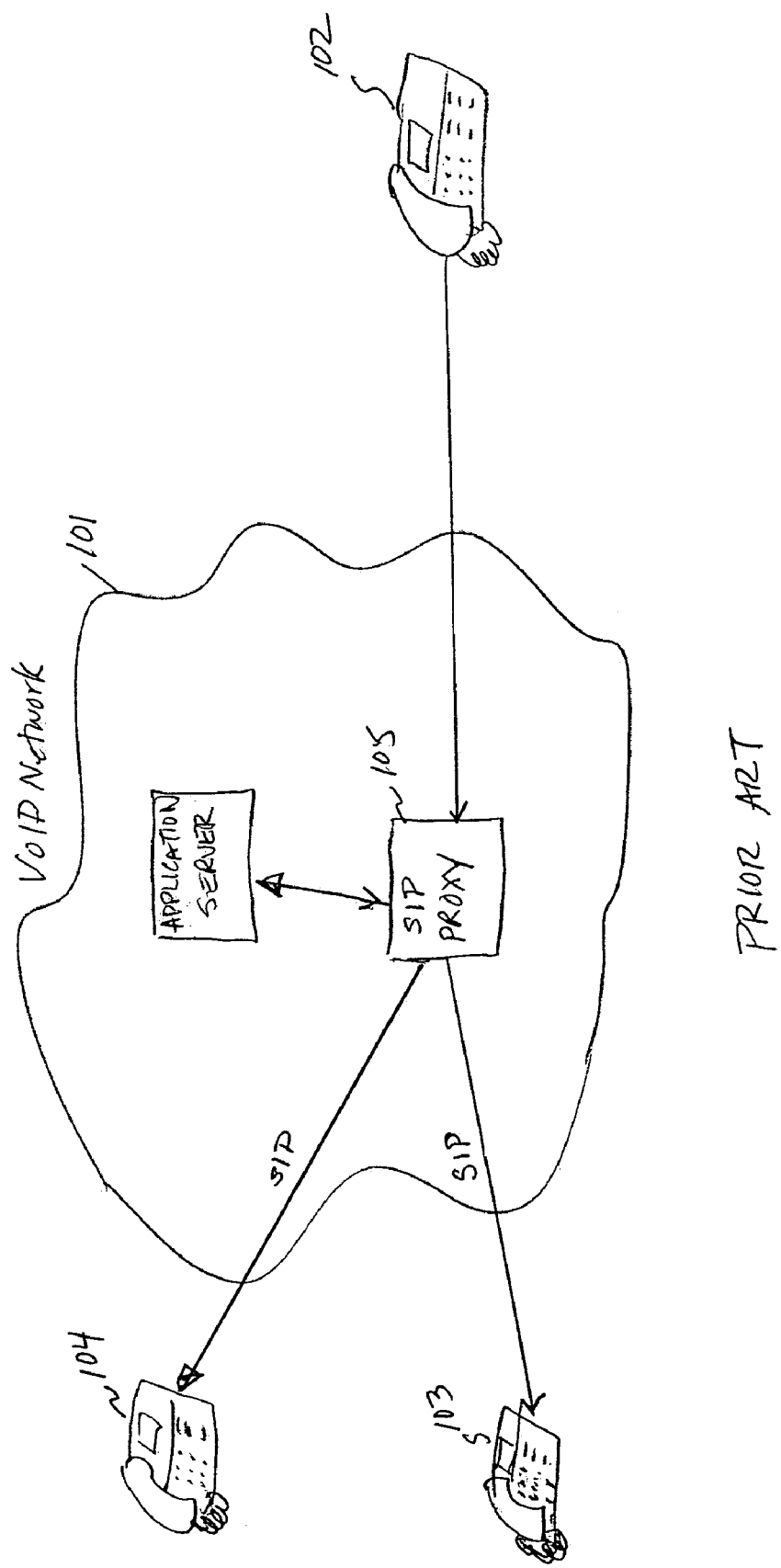
FIG. 1 shows a block diagram of a prior art VoIP network useful for describing VoIP telephony and the providing of endpoint-invoked services are provided either from within the network or by the endpoint.

With reference to FIG. 1, a VoIP network 101 is shown to which illustrative VoIP endpoints terminals 102, 103 and 104 are connected. A location service co-located with the proxy 105 in the network 101 stores information about the endpoint terminals to which it is connected. This information is typically obtained when each endpoint terminal is turned on and includes, for example, contact information in the form of an IP address and possibly other information about the connected endpoint terminal's capabilities. When the end user at endpoint terminal 102 wishes to place a call to the end user at terminal 103, he dials her phone number. Assuming for illustrative purposes that the SIP protocol is being used, endpoint terminal 102 sends an SIP invite request message to SIP proxy 105. Proxy 105 looks up the contact information for the called number and forwards the SIP message to the registered location of endpoint terminal 103. This information includes identification information about endpoint terminal 103 as well as information as to how endpoint terminal 103 can send packetized audio to endpoint terminal 102. A negotiation between the endpoint terminals then automatically takes place to determine the characteristics of the audio streams as well as the IP address at each endpoint terminal at which the audio streams will be received. A direct two-way bearer connection between the endpoints 102 and 103 is then established through the packet network 101 that bypasses proxy 105. At the end of the call when the party at one of the endpoint terminals hangs up, an SIP message is sent via the proxy 105 to the other endpoint terminal to signal the end of the call. The bearer stream between endpoint terminals 102 and 103 is then torn down.

As shown in FIG. 1, both endpoint terminals 102 and 103 are connected to the same VoIP network 101 and share a common SIP proxy 105. If the service provider of the VoIP subscriber at the calling endpoint terminal 102 is different than the service provider of the subscriber at called endpoint terminal 103, then when a call from endpoint terminal 102 is initiated to endpoint terminal 103, the SIP proxy associated with the calling party's VoIP network (not shown) to his which endpoint terminal 102 is connected sends a Domain Name Server (DNS) lookup request to that network's DNS server (not shown). The DNS server then returns to the SIP proxy in the calling party's VoIP network, among other information, the IP address of the SIP proxy associated with the called party's endpoint terminal 103. The SIP proxy associated with endpoint terminal 102 then sends an SIP message to the SIP proxy 105 associated with the called endpoint terminal 103, which in turn, forwards the message to that called endpoint terminal. As described above, negotiations will take place between the two endpoints and a direct two-way bearer connection is thereafter established through the called and calling party's packet VoIP networks.

If the calling party's endpoint terminal is not a VoIP endpoint terminal connected to a VoIP network but a conventional terminal connected to the PSTN (not shown), then when the calling party dials the called VoIP endpoint terminal, a DNS operation determines the IP address of the SIP proxy associated with that called endpoint terminal. PSTN call signaling is then terminated at a switch or other entity within the PSTN and an SIP invite request is generated that is transmitted over one or more VoIP networks to that SIP proxy. A bearer stream is then established through a media gateway (not shown) in the IP network between the called endpoint terminal and the entity within the PSTN where voice signals in digital or analog from the calling telephone are converted to a packet IP stream for transmission to the called endpoint terminal and the packet IP stream from the called VoIP terminal is converted back to a voice signal for transmission to the calling telephone.

Traditionally, from a network-centric standpoint, various end user services have been hosted in the network whether that network is the PSTN or a VoIP network. For a VoIP network an application server 107 within the network can host various VoIP applications such as call forwarding, voicemail, find-me/follow-me, etc. The SIP proxy 105 will be aware of its end user's service subscriptions. Thus, for example, the end user of endpoint terminal 103 could subscribe to a call forwarding service. When endpoint terminal 102 sends an SIP invite message to proxy 105 to establish a connection to endpoint terminal 103, therefore, proxy 105 would know that the end user of endpoint terminal 103 is a subscriber to a call forwarding service and would forward the received SIP message to the application server 107. The application server will then execute the service logic to determine the address to which the call should be forwarded according to a stored schedule. For example, during specified working hours, the subscriber may wish all incoming phone calls to her home endpoint terminal 103 to be forwarded to her work endpoint terminal 104. If the SIP proxy 105 receives an SIP invite message directed to endpoint terminal 103 from endpoint terminal 102 during the specified working hours, the application server 107 then returns to the proxy 105 the SIP address of endpoint terminal 104 to which the SIP message should now be forwarded. Otherwise, the application server returns the SIP address of endpoint terminal 103. Depending upon the schedule, therefore, the SIP message is directed by proxy 105 to either endpoint terminal 103 or 104. After negotiations between endpoint terminal 102 and either endpoint terminal 103 or 104, a two-way bearer connection is established over the VoIP network between the calling and called endpoint terminals.

As previously noted, with the advent of intelligent VoIP endpoint terminals, such services that previously were hosted within the network are now capable of being hosted locally at the intelligent endpoint terminals themselves. The end user can then avoid having to subscribe to network-provided services and can thereby save the monthly fees for such services. Also, by keeping services local to own endpoint terminal, the end user has more control over the specific services he wants and is capable of installing them on his own by downloading those specific services he wants activated directly to his intelligent VoIP endpoint terminal. Thus, for the illustrative call forwarding application, the endpoint terminal 103 stores the end user's desired call forwarding schedule. When an SIP message is received from the SIP 105 proxy during the hours when the subscriber wants her calls forwarded to her work endpoint terminal 104, endpoint terminal 103 responds to the message from proxy 105 with the SIP address of endpoint terminal 104. That address is forwarded to the proxy and the SIP message is then forwarded to the endpoint terminal 104 in order to establish the bearer channel between the calling and call-forwarded endpoint terminals.

As previously noted, however, VoIP endpoint terminals are not as reliable as network application servers, which have backup servers and failover solutions in place to insure reliability. With the increased complexity of intelligent VoIP endpoint terminals, their likelihood to fail is higher and they are susceptible to power outages and, if wireless, being out of reach. As a result, if for any reason the intelligent VoIP endpoint terminal is unavailable, the services implemented on that endpoint will also not be available. Thus, for the illustrative call forwarding service that is implemented on an end user's VoIP endpoint terminal, when the called endpoint terminal is unavailable, call forwarding of incoming calls to that endpoint terminal will not be effective. Thus, if the called endpoint terminal is unavailable, there will be no response to the SIP message and an incoming call will terminate uncompleted.

Figure 2:
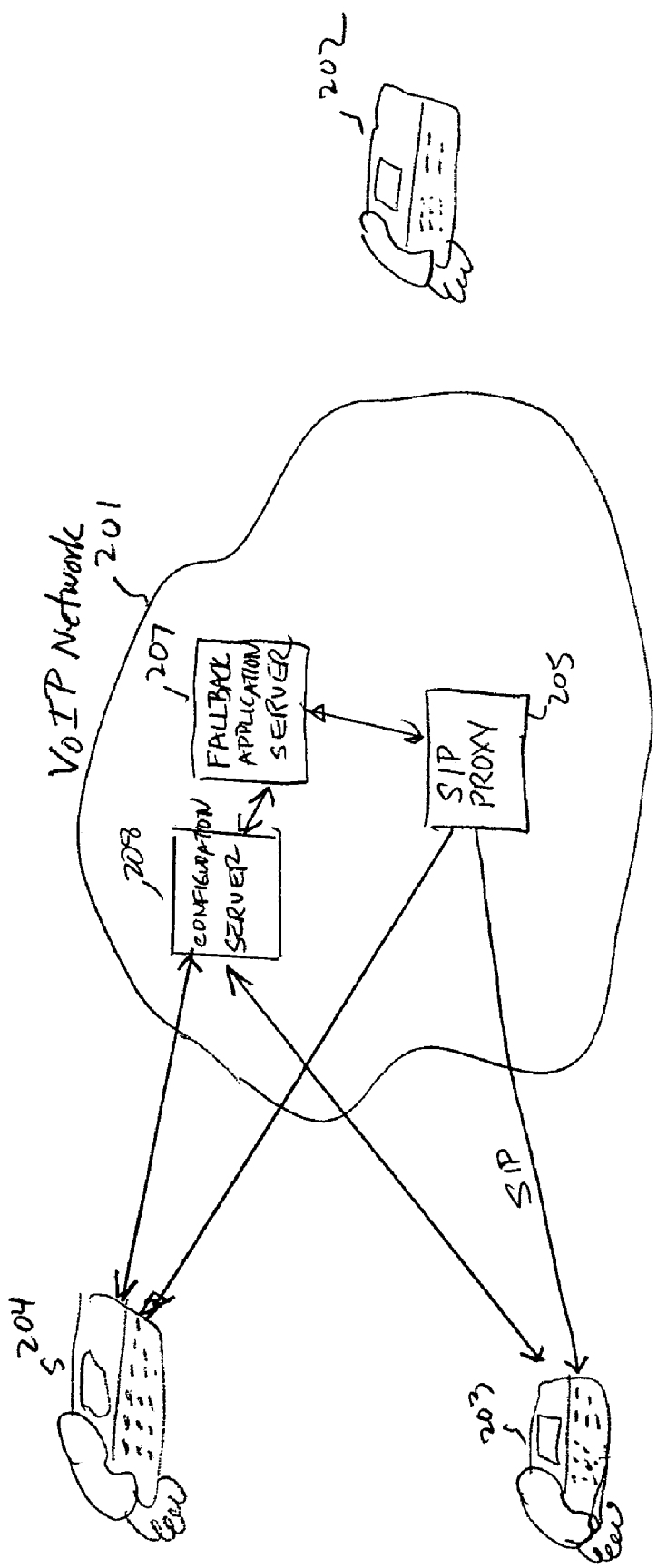
FIG. 2 shows an embodiment of the present invention that provides a fallback service upon the failure of an endpoint terminal-implemented call forwarding service.

In order to avoid the problem associated with the inability to invoke a service that is hosted on an intelligent VoIP endpoint terminal, an embodiment of the present invention provides a fallback application server in the network that takes over only when the SIP proxy determines that the endpoint is unavailable. With reference to FIG. 2, VoIP network 201 is shown to which three illustrative VoIP endpoint terminals 202, 203 and 204 are connected, as in FIG. 1. When the end user at endpoint terminal 202 dials the phone number of the end user of endpoint terminal 203, SIP proxy 205 receives an SIP invite message, looks up the IP address of endpoint terminal 203 and sends an SIP message to that called endpoint terminal. If endpoint terminal 203 has built-in call forwarding capabilities, the SIP address of the end user's work endpoint terminal 204 may be returned to the proxy depending on the stored call-forwarding schedule. The SIP message is then forwarded to endpoint terminal 204. If the called endpoint terminal 203 is turned off, is in a failure mode, or is unavailable for any reason, the attempt by SIP proxy 205 to reach that endpoint terminal and receive a response there from will fail. In accordance with this embodiment, upon the detected failure to receive a response from the called endpoint terminal, a fallback application server 207 within the VoIP network 201 is signaled by SIP proxy 205 if the end user of endpoint terminal 203 is subscribed to a fallback service, which subscription information is stored by the proxy. When fallback application server 207 is signaled, it contacts a configuration server 208, which has stored thereon the call forwarding rules associated with both endpoint terminals 203 and 204. Fallback application server 207 then invokes the call forwarding service that would otherwise be running on the called but non-responsive endpoint terminal 203, and returns the SIP address of endpoint terminal 204 to SIP proxy 205 if the call forwarding rules active at that time would invoke forwarding of incoming calls to that terminal. Alternatively, the fallback application server 207 may also forward the SIP invite message directly to the proxy associated with endpoint terminal 204. If the VoIP service provider wishes to provide such a fallback service to each of its subscribers, then proxy 205 would contact fallback application server 207 for each call directed to a non-responsive endpoint terminal. Fallback application server 207 would then contact the configuration server to determine whether or not the called subscriber has a stored call forwarding profile.

In order that the correct call forwarding information be provided to the fallback application server when it is contacted by the SIP proxy, the configuration server 208 periodically synchronizes its configuration information with information stored on the various endpoint terminals connected to VoIP network for which it is providing fallback service, for example endpoint terminals 203 and 204.

Although the fallback application server 207 is shown as a device separate from the SIP proxy 205, its functionality could be incorporated in proxy 205. An incoming SIP invite message would be directed to a default target address. If the default device does not respond, the proxy will retrieve the forwarding information from the configuration server 208 and handle the forward. The configuration server 208 could also be integrated with the fallback application server 207 and/or the proxy 205.

Regardless of whether the fallback application server is a separate device or incorporated as part of the SIP proxy, advantageously, the SIP proxy does not need to store forwarding information for standard call forwarding that is invoked on an operative and responsive endpoint terminal.

Figure 3:
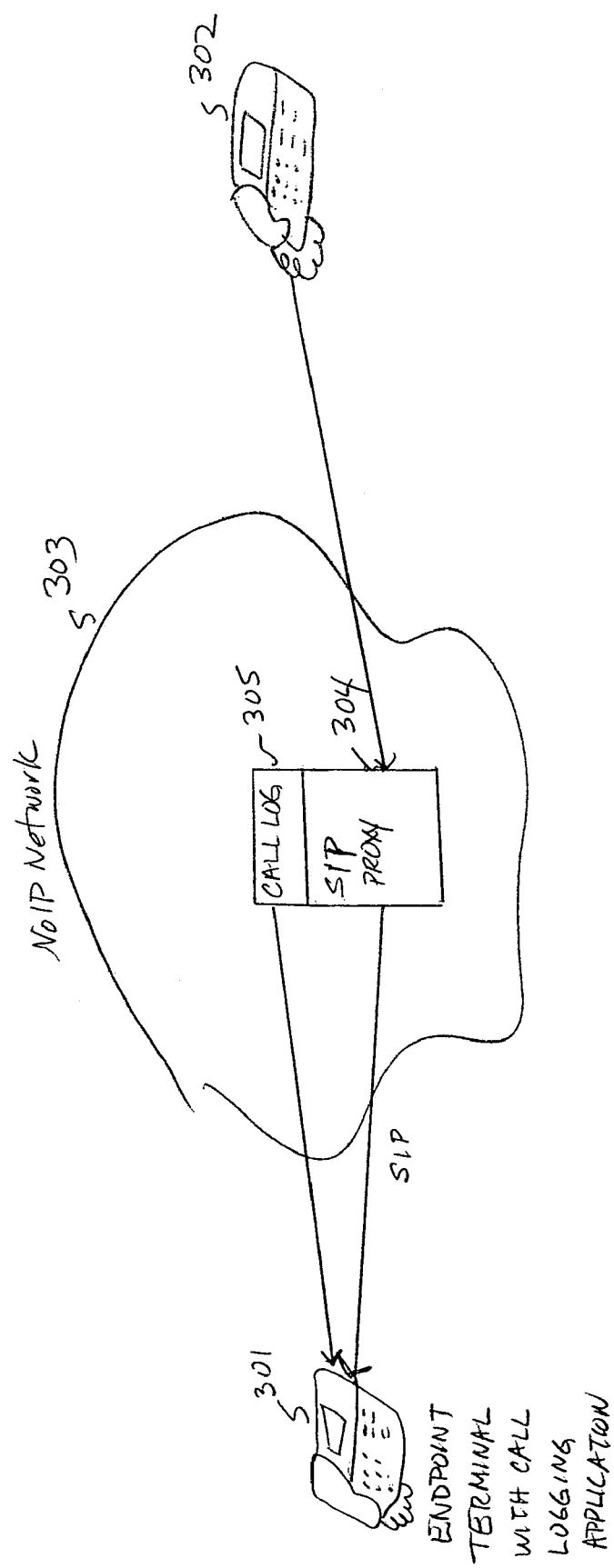
FIG. 3 shows an embodiment of the present invention that provides a fallback call logging service.

Other endpoint terminal implemented services that are invoked for incoming calls can also be protected via a fallback mechanism in a similar manner when the endpoint terminal fails to respond to a proxy message. For example, with reference to FIG. 3, a called VoIP endpoint terminal 301 may have an internal call-logging service that is invoked each time a call is received from a calling terminal 302 or other terminal on or off the VoIP network 303. Such a service creates a log of all incoming calls received by the endpoint terminal. If SIP proxy 304 detects that the called terminal 301 is not available to an incoming call, the proxy creates a call-log 305 for as long as the called endpoint terminal remains unavailable. Although the fallback application service that performs this fallback call-logging service is shown in FIG. 3 as being incorporated within the SIP proxy 304, alternatively it could be implemented in a separate server. As shown in FIG. 3, the call long 305 on SIP proxy 304 logs all incoming calls that it can't deliver to the called endpoint terminal 301. When endpoint terminal 301 again becomes available, the stored log can be downloaded to the endpoint terminal-implemented call log. The availability of endpoint terminal 301 can be determined by periodically checking by the proxy to determine whether it is available, by programming the endpoint terminal to send a signal to the proxy/fallback application server when it is powered up, by determining that a subsequent call attempt to that endpoint terminal has been successful, or by signaling the proxy/fallback application server when an outgoing call is placed by that endpoint terminal through the SIP proxy.

Figure 4:
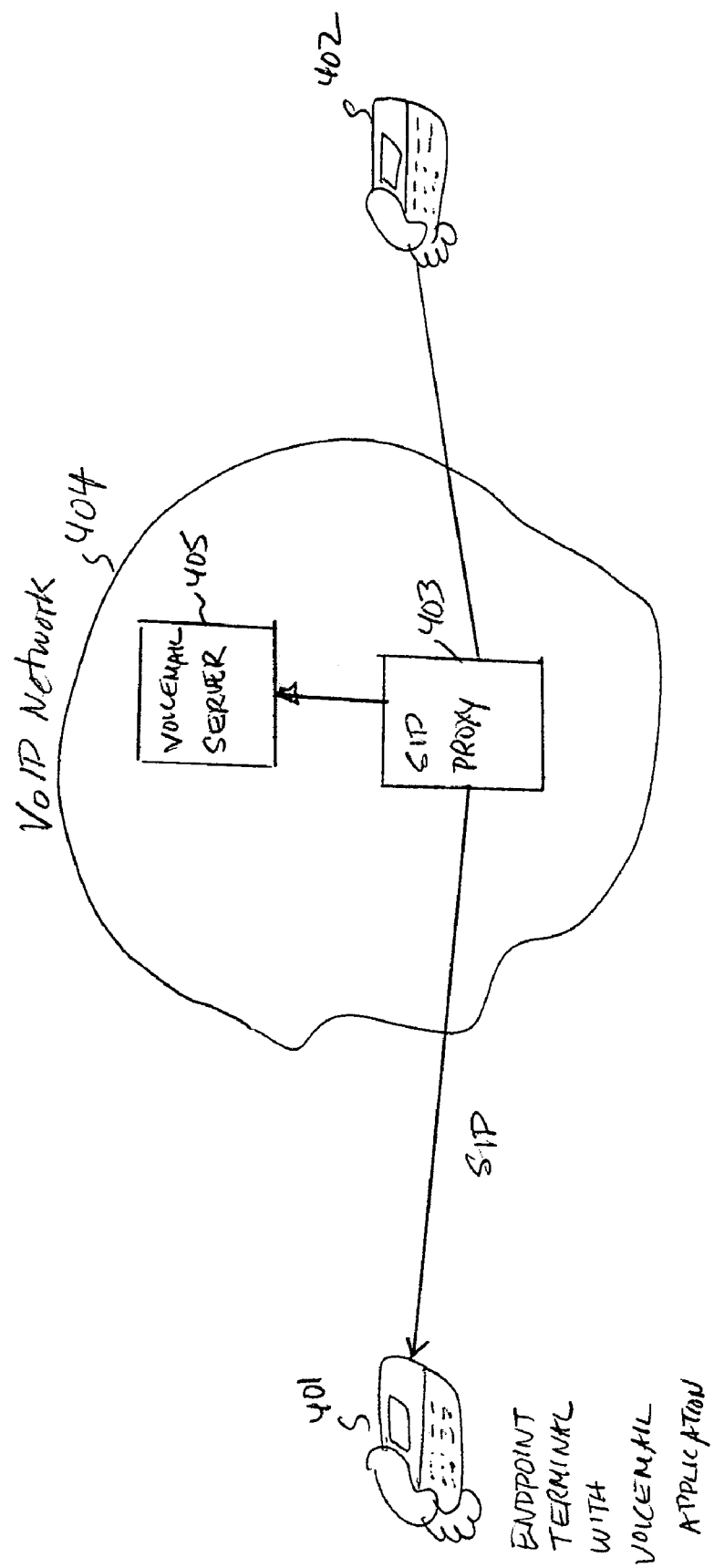
FIG. 4 shows an embodiment of the present invention that provides a fallback voicemail service.

FIG. 4 shows an embodiment of the present invention as applied to a fallback voicemail service. In this embodiment endpoint terminal 401 has a built-in voicemail capability. When endpoint terminal 402 places a VoIP call to endpoint terminal 401 over VoIP network 404, as previously described, an SIP invite message is transmitted to proxy 403 and thence to endpoint terminal 401. If the end user at endpoint terminal 401 does not answer, then the voicemail application running on endpoint terminal 401 transmits playback a message to the calling party and records any voice message left by the calling party. If, however, for any reason endpoint terminal 401 is inoperative and proxy 403 does not receive a response to the invite message, then it sends a message to the fallback application server within VoIP network 404, shown as voicemail server 405. A bearer connection is thereafter established between voicemail server 405 and calling endpoint terminal 402. Advantageously, the proxy only forwards a call to the network voicemail server 405 if the called endpoint terminal 401 has failed or is inoperative for any reason. Thus only a small number of voicemails will need to be stored in the network. This service can be provided only to subscribers who subscribe to the fallback service or all the service provider's subscribers. If the former, the proxy 403 will only forward the call to the voicemail server 405 if it determines that the call endpoint 401 has subscribed to the service. From the standpoint of the subscriber at called endpoint terminal 401, voicemail advantageously is always available to her regardless whether her terminal is on or off, out of reach (if a mobile terminal), or inoperative due to a failure.

The above embodiments are illustrative of providing within the VoIP network a fallback service to a detected inability of that service to be provided by an intelligent VoIP endpoint terminal that otherwise provides that service. Advantageously, the fallback application server requires fewer resources than a standard network-based application server since it needs to handle only those service requests when the intelligent endpoint terminals with which it is associated are unavailable. Many other endpoint terminal-provided services in addition to those described above could also be similarly fault protected. Further, although the above-described embodiments have been described using the SIP protocol, similar solutions could be implemented using other VoIP protocols whether presently available or as will be developed in the future.

The foregoing therefore merely illustrates the principles of the invention. It will thus be appreciated that those skilled in the art will be able to devise various arrangements, which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the diagrams herein represent conceptual views illustrating the principles of the invention. The functions of the various elements shown in the figures, including functional blocks labeled as "servers" or "proxies" may be provided through the use of dedicated hardware as well as hardware capable of executing software in association with appropriate software.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicants thus regard any means which can provide those functionalities as equivalent as those shown herein.

The invention claimed is:

1. A method in a VoIP network to which an intelligent VoIP endpoint terminal is connected, the method comprising the steps of:
   determining whether the intelligent VoIP endpoint terminal is responsive to providing an installed service; and
   providing the service from within the VoIP network only when it is determined that the VoIP endpoint is not responsive to providing the service;
   wherein the step of providing the service comprises the step of determining information about the installed service on the intelligent VoIP endpoint terminal in order to provide that same service from within the VoIP network.

2. The method of claim 1 wherein the step of determining is performed in response to an incoming call to the intelligent VoIP endpoint terminal.

3. The method of claim 2 wherein the service is a call forwarding service.

4. The method of claim 2 wherein the service is a call logging service.

5. The method of claim 2 wherein the service is a voicemail service.

6. The method of claim 1 wherein a proxy in the VoIP network performs the step of determining.

7. The method of claim 6 wherein the proxy is a SIP proxy.

8. The method of claim 1 wherein the step of determining information about the installed service comprises retrieving information stored in the network about the installed service.

9. The method of claim 8 wherein the information stored in the network about the installed service is periodically synchronized with corresponding information about the service that is stored by the intelligent VoIP endpoint terminal.

10. The method of claim 1 further comprising the step of providing to the intelligent VoIP endpoint terminal information about the service provided from within the VoIP network when the endpoint terminal is determined to be capable of being responsive to providing the service itself.

11. Apparatus for use in a VoIP network to which an intelligent VoIP endpoint terminal is connected, the apparatus comprising:
   a proxy to determine whether the intelligent VoIP endpoint terminal is responsive to providing an installed service;
   a fallback application server that provides the service from within the VoIP network only when the proxy determines that the VoIP endpoint is not responsive to providing the service; and
   a configuration server which stores information about the installed service on the intelligent VoIP endpoint terminal and provides that information to the fallback application server so that the fallback application server can provide that same service from within the VoIP network.

12. The apparatus of claim 11 wherein the proxy determines whether the intelligent VoIP endpoint is responsive to providing an installed service in response to an incoming call to the intelligent VoIP endpoint terminal.

13. The apparatus of claim 12 wherein the service is a call forwarding service.

14. The apparatus of claim 12 wherein the service is a call logging service.

15. The apparatus of claim 12 wherein the service is a voicemail service.

16. The apparatus of claim 11 wherein the proxy is a SIP proxy.

17. The apparatus of claim 11 wherein the information about the installed service stored by the configuration server is retrieved by the configuration server from the intelligent VoIP endpoint terminal.

18. The apparatus of claim 11 wherein configuration server periodically synchronizes its stored information with corresponding information about the service that is stored by the intelligent VoIP endpoint terminal.

19. The apparatus of claim 11 wherein the fallback application server provides to the intelligent VoIP endpoint terminal information about the service it provides from within the VoIP network when the proxy determines that the endpoint terminal is capable of being responsive to provide the service itself.

* * * * *